United States Patent
Alfani et al.

(10) Patent No.: US 10,895,299 B2
(45) Date of Patent: Jan. 19, 2021

(54) FRICTION MATERIALS FOR BRAKE PADS BASED ON BINDING COMPOSITIONS AND RELATED BRAKE PADS

(71) Applicants: Italcementi S.p.A., Bergamo (IT); Freni Brembo S.p.A., Curno (IT)

(72) Inventors: Roberta Alfani, Bergamo (IT); Andrea Bonfanti, Curno (IT); Giovanni Cividini, Bonate Sopra (IT); Giuseppe Manganelli, Bergamo (IT); Flavio Rampinelli, Urgnano (IT); Alessandro Sanguineti, Curno (IT); Federico Tosi, Curno (IT)

(73) Assignees: FRENI BREMBO S.P.A., Curno (IT); ITALCEMENTI S.P.A., Bergamo (IT)

( * ) Notice: Subject to any disclaimer, the term of this patent is extended or adjusted under 35 U.S.C. 154(b) by 228 days.

(21) Appl. No.: 15/770,345

(22) PCT Filed: Oct. 21, 2016

(86) PCT No.: PCT/IB2016/056345
§ 371 (c)(1),
(2) Date: Apr. 23, 2018

(87) PCT Pub. No.: WO2017/068541
PCT Pub. Date: Apr. 27, 2017

(65) Prior Publication Data
US 2018/0231087 A1 Aug. 16, 2018

(30) Foreign Application Priority Data
Oct. 23, 2015 (IT) .................. 102015000065027

(51) Int. Cl.
*F16D 69/02* (2006.01)
*C04B 28/04* (2006.01)
*C04B 28/08* (2006.01)
*C04B 111/00* (2006.01)
*F16D 65/095* (2006.01)

(52) U.S. Cl.
CPC ............ *F16D 69/028* (2013.01); *C04B 28/04* (2013.01); *C04B 28/08* (2013.01); *F16D 69/027* (2013.01); *C04B 2111/00362* (2013.01); *F16D 65/095* (2013.01); *F16D 2200/0004* (2013.01); *F16D 2200/0034* (2013.01); *F16D 2200/0069* (2013.01); *F16D 2200/0086* (2013.01); *F16D 2200/0095* (2013.01); *Y02W 30/91* (2015.05)

(58) Field of Classification Search
CPC ............... C04B 28/04; C04B 28/08; C04B 2111/00362; F16D 69/027; F16D 69/028; F16D 65/095; F16D 2200/0004; F16D 2200/0034; F16D 2200/0069; F16D 2200/0086; F16D 2200/0095
See application file for complete search history.

(56) References Cited

U.S. PATENT DOCUMENTS

| 4,792,361 | A | | 12/1988 | Double et al. |
| 5,433,774 | A | * | 7/1995 | Kapl .............. F16D 69/027 106/36 |
| 2014/0261088 | A1 | | 9/2014 | Bullerjhan et al. |

FOREIGN PATENT DOCUMENTS

| CN | 103906719 A | 7/2014 |
| EA | 201490454 A1 | 6/2014 |
| EP | 0273181 A2 | 7/1988 |
| WO | 2014/203142 A1 | 12/2014 |

OTHER PUBLICATIONS

Lekahena, Clifford, et al. International Search Report and Written Opinion, EPO, dated Jan. 17, 2017.

* cited by examiner

*Primary Examiner* — Anthony J Green
(74) *Attorney, Agent, or Firm* — Florek & Endres PLLC (57) ABSTRACT

An improved friction material is described, comprising a binding composition based on a hydraulic binder, and its use in brake pads and industrial applications.

17 Claims, 3 Drawing Sheets

FRICTION MATERIALS FOR BRAKE PADS BASED ON BINDING COMPOSITIONS AND RELATED BRAKE PADS

The present invention relates to improved friction materials for brake pads based on binding compositions and related brake pads.

The present invention falls within the field of friction materials for brake pads which, as is known, must have a composition which is such as to guarantee uniform and reliable performances within a wide range of operating conditions.

In particular, as disc brake pads for vehicles operate under particularly demanding operative conditions, as they must ensure reliability and, at the same time, durability, producers have constantly tried to improve the features and performances of the relative friction materials.

Brake pads consist of a support, generally metallic, and a layer that guarantees friction composed of various materials. The efficiency (i.e. the braking capacity) or duration of the pad can be favoured by suitably selecting the composition of the friction material and properties of the same material.

Friction materials have been developed in the state of the art, containing steel and different types of metals in variable quantities (such as: copper, aluminium, zinc, etc.) and comprising, as binding element, thermosetting resins among which phenolic resins as such and/or modified phenolic/derivative resins (silicon, acrylic, epoxy). These thermosetting resins, present in numerous friction materials for brake pads in a percentage ranging from 8% to 20% by weight with respect to the total weight of the composition of the friction material, require a hot moulding process of the braking blend and guarantee optimum final performances of the brake pad: braking capacity, resistance to wear and abrasion, etc.

The use of thermosetting phenolic resins, however, has various disadvantages, first of all a problem of eco-sustainability and potential toxicity. As a result of thermo-oxidative degradation during processing and also during the use of the end-product, these resins can, in fact, release ascertained toxic and/or potentially toxic substances deriving from phenol and formaldehyde, basic components of the resin. In accordance with the regulation EC 1272/2008, phenol is classified as a toxic substance which can be harmful in the case of prolonged contact with the skin and class 3 mutagenic. The search for alternatives for reducing the entry of phenols into the environment is active in numerous fields of industrial research; this problem has also been faced in the field of friction materials. Within the context of research activities for new friction materials, the applicants have filed a patent application WO 2014/203142. The invention described in patent application WO 2014/203142 falls within the field of friction materials for brake pads, free of phenolic resins and which, as specified above, have a composition which is such as to guarantee uniform and reliable performances within a wide range of operating conditions.

In this patent application, a binding composition based on a hydraulic binder has been developed, for the production of friction materials to be used in the production of brake pads which at the same time meet the necessary technical specifications, such as thermo-mechanical characteristics, also guaranteeing a high eco-sustainability, i.e. overcoming the drawbacks of friction materials containing phenolic resins and friction materials based on a hydraulic binder according to the state of the art.

The binding composition based on a hydraulic binder present in the friction material described in WO 2014/203142, already completely substitutes thermosetting resins, ensuring overall improved performances of the brake pads. Braking capacity, wear resistance, abrasion resistance, etc. are comparable to those of brake pads according to the state of the art produced with binders in thermosetting resins.

In particular, the tribological characteristics of the friction material according to WO 2014/203142 were determined through tests called "SAE J2522" (hereafter indicated as "AK Master"). The AK Master test is a performance test, in which a pair of pads is tested under various braking conditions: after a trial stage, a series of brakings are simulated at different pressures and velocities (low, intermediate and high), and characteristic brakings, such as cold braking and motorway braking. The material, object of patent application WO 2014/203142 brilliantly passed the AK Master test described above, also allowing the production of cementitious-based brake pads through a compression moulding process.

The material object of patent application WO 2014/203142 has proved, however, to have a poorer performance when subjected to more demanding tests (for example when subjected to a tribological test called "high-temperature internal test") under more severe temperature conditions, analogous to those provided for verifying the resistance to heat and intensive use of the braking system on sports cars. This material, in fact, has significant surface delaminations, under the conditions envisaged by the "high-temperature internal test".

The production of braking systems comprising a binding matrix based on silicates free of thermosetting organic resins, is also known from the state of the art and more specifically U.S. Pat. No. 5,433,774. These silicate-based systems, possibly with the addition of alkaline oxides and aluminates, are generally produced at low temperatures and in the absence of high pressures by means of a curing process in which a mixture of silicon oxide and other silicates, at least partially soluble in water, generate, at low temperature, a three-dimensional compact matrix. In this process, the water does not participate in the formation reaction of the braking system, but behaves exclusively like a solvent, completely evaporating. US'774 consequently already describes a friction material free of phenolic resins, as also the friction material described in WO'142, which, however, when subjected to the "high-temperature test" is not satisfactory with respect to performance.

An objective of the present invention is to identify a binding composition or matrix based on a hydraulic binder, that allows the production of friction/braking materials and the use of said friction materials in brake pads that at the same time satisfy the necessary technical specifications, such as thermo-mechanical specifications, also guaranteeing a high eco-sustainability, overcoming the drawbacks of the friction materials according to the state of the art.

An object of the present invention therefore relates to a friction material for brake pads which comprises:
i) a multicomponent braking blend and
ii) a composition or binder matrix based on a hydraulic binder, comprising
   a) a hydraulic binder consisting of a common cement clinker, composed for at least two thirds in mass of calcium silicates [$3CaO \cdot SiO_2$] and [$2CaOSiO_2$], the remaining part consisting of $Al_2O_3$, $Fe_2O_3$ and/or other minor oxides;

b) an activator selected from one or more salts and/or hydroxides and/or oxides of alkaline and/or alkaline earth metals and/or silicon;
c) one or more materials having a pozzolanic activity or one or more materials having a latent hydraulic activity and/or mixtures of the same;

said composition or binder matrix being hardened by means of a hydration reaction with water.

A further object of the present invention also relates to brake pads composed of a friction material comprising i) a multicomponent braking blend, ii) a binding composition based on a hydraulic binder and iii) a metallic support base.

An object of the present invention also relates to the use of said friction material in brake pads and in further industrial applications.

In testing the tribological features of the friction material according to the present invention, as already indicated, a test called "high-temperature internal test" was used.

This test is conducted on a dynamic bench, where the experimental setup is assembled, including calipers, disc and brake pad, which replicates the system fitted on the axle shaft of the selected vehicle, to which a flywheel that simulates an inertial load equivalent to the mass of the fully loaded vehicle, is connected. A first running phase provides 60 brake applications from 80 Km/h to 30 Km/h with a controlled deceleration of 3 m/s$^2$ and an initial disc temperature of 100° C. The test then consists of a series of brakings all with a defined initial speed, equal to 80% of the maximum speed of the vehicle and a final speed equal to 90 Km/h, with a deceleration greater than or equal to 7 m/s$^2$. A total of 25 brake applications are effected, interspersed by a cooling time of 80 seconds, followed by 5 brakings under the same speed and deceleration conditions are those indicated above, effected however after cooling the system to the initial disc temperature specified above.

The friction material according to the present invention passes the test described above and proves to have a higher performance with respect to the friction material described in patent application WO'142 and in patent US'774, as when the pads produced with the material according to the present invention are subjected to this test, they do not show evident surface defects such as deep and extensive cracks and surface delaminations, remaining intact at the end of the test, contrary to what occurs with the cementitious materials according to the state of the art previously considered. The binding compositions based on a hydraulic binder of the friction material, object of the present invention, therefore allow better results to be obtained with respect to the cementitious friction materials of the state of the art, also under much more severe test conditions.

The composition or binding matrix based on a hydraulic binder present in the friction material according to the present invention completely substitutes thermosetting resins, it guarantees a high and improved eco-sustainability, in addition to overall improved performances for the brake pad according to the present invention. The binding compositions according to the present invention, in fact, provide performances in terms of friction, resistance to wear and abrasion, braking capacity, duration and other features, substantially equal to a conventional product that uses materials based on thermosetting resins, and also with respect to known products that use other types of binders.

The friction material, object of the present invention, further differs from the system described in US'774, which does not comprise thermosetting resins. In the material according to the present invention, in which the binding matrix is based on a hydraulic binder comprising any common cement clinker, as defined according to the standard UNI EN 197.1, i.e. a hydraulic material composed for at least two thirds in mass of calcium silicates [$3CaO.SiO_2$] and [$2CaO.SiO_2$], the remaining part consisting of $Al_2O_3$, $Fe_2O_3$ and/or other minor oxides (for example a Portland cement clinker), the hardening process of the binding part, in powder form, is induced by the presence of water, according to the definition of hydraulic binder. Water participates actively in the formation process of the brake pad: the hydraulic binder in powder form, when mixed with water, hardens by hydration regardless of the temperature conditions (provided they are higher than 4° C., below which the water is no longer in an available form for the hydration reaction) and, after hardening, maintains its resistance and stability.

Consequently, during the production process of the brake pad, much lower temperature conditions are adopted, lower than 90° C., simply to speed up the hardening process of the hydraulic binder with short curing times, according to what is known in the state of the art on cement-based end-products, and therefore make the hardening process compatible with the moulding times of the production process of the brake pad.

In the case of US'774, on the other hand, the inorganic binder based on silicates, comprising finely divided silica and silicates at least partially soluble in water, is crosslinked in the presence of water, at a temperature lower than 120° C., without the application of pressure, to form an inorganic, three-dimensional, lattice of polysilicates, in which the water acts as solvent.

The fundamental advantage of the friction material according to the present invention, with respect to friction materials based on cementitious compositions already known in the state of the art, lies in the fact that the friction material according to the present invention also passes the high-temperature test described above and proves to have a higher performance with respect to the friction material described in patent application WO'142 and in patent US'774, as the pads produced with this material do not show any evident surface defects, also remaining intact at the end of the test.

As already indicated, the present invention relates to a friction material for brake pads which comprises
i) a multicomponent braking blend and
ii) a composition or binder matrix based on a hydraulic binder, comprising:
a) a hydraulic binder consisting of a common cement clinker, composed for at least two thirds in mass of calcium silicates [$3CaO.SiO_2$] and [$2CaO.SiO_2$], the remaining part consisting of $Al_2O_3$, $Fe_2O_3$ and/or other minor oxides;
b) an activator selected from one or more salts and/or hydroxides and/or oxides of alkaline and/or alkaline earth metals and/or silicon;
c) one or more materials having a pozzolanic activity or one or more materials having a latent hydraulic activity and/or mixtures of the same;

said composition or binder matrix being hardened by means of a hydration reaction with water.

The term "composition or binder matrix based on a hydraulic binder", according to the present invention, therefore refers to a material in powder form comprising, or consisting of, a hydraulic binder, an activator and, possibly, one or more materials having a pozzolanic activity or one or more materials having a latent hydraulic activity and/or mixtures thereof.

The term "hydraulic binder" refers to a material in powder form which, when mixed with water, hardens by hydration regardless of the temperature conditions provided they are higher than 4° C. (at which the water is no longer in an available form for the hydration reaction) and which, after hardening, maintains its resistance and stability.

The hydraulic binder a) present in the binding composition of the friction material according to the present invention comprises any common cement clinker, as defined by the standard UNI EN 197.1, i.e. a hydraulic material composed for at least two thirds in mass of calcium silicates $[3CaO.SiO_2]$ and $[2CaO.SiO_2]$, the remaining part consisting of $Al_2O_3$, $Fe_2O_3$ and/or other minor oxides (for example a Portland cement clinker).

Minor oxides refer to oxides of other metals normally present in common clinkers, such as magnesium and/or potassium oxides, in a minor amount, equal to about 2-3% by weight with respect to the total weight of the cement clinker.

White, grey or pigmented cements defined according to the aforementioned standard UNI EN 197.1, together with so-called cements for retention barriers, cementitious binders and hydraulic limes, as defined in the Italian Law of May 26 1965 N. 595, and inorganic silicates, are also included within the wide definition of hydraulic binder according to the present invention. Preferred cements as "hydraulic binder" according to the present invention are Portland cement of type I, a blast-furnace cement of type III, a pozzolan cement of type IV and mixtures thereof. When the hydraulic binder a) is a blast-furnace cement of type III or pozzolan cement of type IV and mixtures thereof, said cement can form either component a) or component c) of the binding composition ii), i.e. it can also satisfy the condition of the presence of one or more materials having a pozzolanic activity or one or more materials having a latent hydraulic activity and/or mixtures of the same in said binding composition ii).

The hydraulic binder a) preferably has a fineness, measured according to the standard UNI EN 196-6 air permeability method (Blaine), ranging from 3,500 to 9,000 $cm^2/g$, more preferably from 4,000 to 8,000 $cm^2/g$ and even more preferably ranging from 5,500 to 7,000 $cm^2/g$.

The "hydraulic binder" a) is even more preferably a Portland cement of type I, a blast-furnace cement of type III, a pozzolan cement of type IV and mixtures thereof and has a fineness, measured according to the standard UNI EN 196-6 air permeability method (Blaine), ranging from 3,500 to 9,000 $cm^2/g$, more preferably from 4,000 to 8,000 $cm^2/g$ and even more preferably ranging from 5,500 to 7,000 $cm^2/g$.

The selection of these particular types of cement, in fact, allows the thermal stability and mechanical resistance to be further increased, which are maximum in the case of Portland cement of type I additionally ground until a fineness ranging from 5,500 to 7,000 $cm^2/g$ is obtained.

The binding composition ii) based on a hydraulic binder according to the present invention also comprises a component b) which is an activator selected from one or more salts and/or hydroxides and/or oxides of alkaline and/or alkaline earth metals and/or silicon.

The salts and/or hydroxides and/or oxides of alkaline and/or alkaline earth metals and/or silicon can be added in powder form or in solution at various concentrations.

Examples of these substances are: silicon oxide, potassium oxide, sodium oxide, potassium hydroxide, sodium hydroxide and silicates. Preferred examples of these substances are: silicon oxide, potassium oxide, potassium hydroxide and silicates.

The binding composition ii) based on a hydraulic binder according to the present invention must also comprise a component c) consisting of one or more materials having a pozzolanic activity, such as, preferably, inicrosdica, fly ash, pozzolan, silica fume, metakaolin, and/or one or more materials having a latent hydraulic activity, such as blast-furnace slag; hydrated calcium; natural limestone.

A non-limiting example of blast-furnace slag is that having the following chemical composition (XRD analysis):

| RX Spectrophotometric Analysis | |
| --- | --- |
| Silicon Oxide (SiO$_2$) | 33.04 |
| Aluminium oxide (Al$_2$O$_3$) | 10.85 |
| Iron Oxide (Fe$_2$O$_3$) | 1.93 |
| Calcium Oxide (CaO) | 42.56 |
| Magnesium Oxide (MgO) | 7.01 |
| Sulfates (SO$_3$) | 2.82 |
| Potassium Oxide (K$_2$O) | 0.23 |
| Sodium Oxide (Na$_2$O) | 0.43 |
| Titanium Oxide (TiO$_2$) | 0.47 |
| Phosphorous Oxide (P$_2$O$_5$) | 0.08 |
| Manganese Oxide (Mn$_2$O$_3$) | 0.30 |

Component c) also preferably has a fineness, measured according to the standard UNI EN 196-6 air permeability method (Blaine), ranging from 3,500 to 9,000 $cm^2/g$, more preferably from 4,000 to 8,000 $cm^2/g$ and even more preferably ranging from 5,500 to 7,000 $cm^2/g$.

In a binding composition ii), component c) is characterized by preferably having a fineness equal to that of the hydraulic binder a).

For the purposes of the present invention, the binding composition ii) based on a hydraulic binder, can also comprise aggregates.

Said aggregates, or inert products, also called inert aggregates, can be selected from calcareous, silica or silico-calcareous aggregates, defined according to the standards UNI EN 13139 and UNI EN 12620. The aggregates can be suitably selected from calcareous aggregates, of quartz, or silico-calcareous aggregates in any form, crushed or spherical. Said aggregates can comprise one or more fillers of a mineral origin, for example calcareous, silica or silico-calcareous fillers or quartz, having a fine particle size according to the definition of the standard UNI EN 13139.

For the purposes of the present invention, the binding composition ii) based on a hydraulic binder can also contain a waterproofing or water-repellent agent or additive. Said agents comprise a wide variety of compounds of an organic nature, such as silanes.

In addition to the above components, the binding composition ii) based on a hydraulic binder present in the friction material object of the present invention, can comprise various other additives for adapting the characteristics of the mixture to the specific requirements.

Examples of these additives can be superfluidifying agents, preferably of the polycarboxylic type, anti-shrinkage agents, hardening and/or setting accelerators, rheology modifiers or modifiers of physical-mechanical properties, such as, for example, celluloses or latexes, expansion agents, aerating, deaerating and adhesion agents. These additives are optional for the purposes of the invention.

The binding composition ii) based on a hydraulic binder is present in a quantity ranging from 3 to 60% by weight with respect to the total weight of the mixture forming the friction material, and is preferably present in a quantity ranging from 5 to 52% by weight with respect to the total weight of the mixture forming the friction material (given by the sum of components i) and ii)).

The preferred quantity of 5 to 52% by weight with respect to the total weight of the mixture forming the friction material allows an optimum friction material to be obtained with respect to the mechanical seal characteristics in the shear process and under thermo-oxidative conditions. In said binding composition ii) based on a hydraulic binder, the hydraulic binder a) is present in a quantity ranging from 0.5 to 95% by weight, preferably from 10 to 93% by weight, with respect to the total weight of the binder composition ii), the activator b) is present in a quantity ranging from 0.5 to 50% by weight with respect to the total weight of the binder composition ii), the materials having a pozzolanic activity and/or latent hydraulic activity c), when provided, are present in a quantity ranging from 0.5 to 95% by weight, preferably from 10 to 93% by weight, with respect to the total weight of the binder composition ii), possible aggregates are present in a quantity ranging from 0 to 20% by weight with respect to the total weight of the binder composition ii), possible additives of a different nature are present in a quantity ranging from 0 to 5% by weight with respect to the total weight of the binder composition ii).

For the purposes of the present invention, the total water added, necessary for the hardening process of the hydraulic binder, is in a quantity ranging from 25 to 150% by weight with respect to the total weight of the binder composition based on a hydraulic binder ii), preferably in a quantity ranging from 50 to 150% by weight.

A part of the water is eliminated in the initial pressing phase during the moulding step of the pad. More specifically, the binding composition ii), whose quantity ranges from 3 to 60% by weight, is composed of components a), b) and c) and, possibly, of the aggregates and additives indicated above with reference to the binding composition. The quantity of water therefore ranges from 25 to 150% with respect to the total weight of said binding composition.

The friction material according to the present invention is a material which, in addition to the binding composition ii) and water necessary for the hardening process, also comprises a "Multicomponent Braking Blend" i), comprising or consisting of: fibers, lubricants, abrasives, friction modifiers and/or other additional materials.

The friction material according to the present invention, in addition to the binding composition ii) based on a hydraulic binder present in a quantity ranging from 3 to 60% by weight with respect to the total weight of the mixture forming the friction material and water in a quantity ranging from 25 to 150% by weight with respect to the total weight of the binding composition based on a hydraulic binder ii), also comprises a multicomponent braking blend i) in a quantity ranging from 30 to 97% by weight, preferably from 50 to 95%, with respect to the total weight of the mixture forming the friction material.

The multicomponent braking blend i) of the friction material according to the present invention comprises at least one lubricant in a quantity ranging from 5 to 15% by weight, at least one abrasive in a quantity ranging from 8 to 25% by weight, at least one component containing carbon in a quantity ranging from 8 to 25% by weight, at least one modifier in a quantity ranging from 15 to 30% by weight, all percentages being calculated with respect to the total weight of the multicomponent braking blend i).

The multicomponent braking blend i) of the friction material according to the present invention can optionally comprise one or more fibers in a quantity ranging from 2 to 30% by weight with respect to the total weight of the multicomponent braking blend i).

Possible examples of fibers, from which the fiber used in the multicomponent braking blend i) of the friction material according to the present invention is selected, can be: fibers based on polyacrylonitrile, polyamides, cellulose fibers, metal fibers, basalt fibers, steel fibers and carbon fibers.

Possible examples of lubricants, from which the lubricant used in the multicomponent braking blend i) of the friction material according to the present invention is selected, can be organic lubricants and metal lubricants, mixtures of metal sulfides (such as tin sulfides, zinc sulfide, iron sulfides and molybdenum sulfide), boron nitride, tin powder and zinc powder.

The lubricant is preferably selected from metal sulfides.

Possible examples of abrasives, generally classified on the basis of their Mohs hardness, from which the abrasive used in the multicomponent braking blend i) of the friction material according to the present invention is selected, can be mineral fibers, zirconium oxide, zircon, zirconium silicate, mica, alumina, ceramic fibers; calcium, magnesium, zirconium and/or aluminum silicates; synthetic mineral fibers such as hardwool, slagwool and rock wool, silica, silicon dioxide, sand, silicon carbide, iron oxide, iron chromite, magnesium oxide and potassium titanate.

The abrasive in the friction material according to the present invention is preferably selected from metal oxides and other abrasives having a hardness according to the Mohs scale, higher than 6. Possible examples of a component containing carbon, from which said component of the multicomponent braking blend i) of the friction material according to the present invention is selected, can be natural graphite, synthetic graphite, petroleum coke, desulfurized petroleum coke and carbon black.

The above-mentioned component containing carbon is preferably selected from graphites and coke.

Possible examples of modifiers, from which the modifiers of the multicomponent braking blend i) of the friction material according to the present invention are selected, can be lime, calcium oxide, calcium hydroxide, talc, calcium carbonate, calcium silicate, barite, fluorinated compounds, metal powders, rubber in powder form or recycled rubber (in pieces) and various other types of friction powders.

The modifier is preferably selected from barite and metal powders.

A preferred friction material according to the present invention consists of
ii) a binding composition based on: a) Portland cement of type I 52.5, with a fineness of 6,500 $cm^2/g$, b) potassium silicate and potassium hydroxide, c) slag with a fineness of 6,500 $cm^2/g$ and metakaolin, and water and i) a multicomponent braking blend comprising components preferably selected from metal oxides, steel fibres, aramidic fibers, chromite, metal sulfides, graphite, coke, metal powders and barite.

In a further preferred friction material, the Portland cement type I is substituted by blast-furnace cement type III.

Preparation Process

The various components listed above, and specifically the binding composition ii), the multicomponent blend i) and the water, form the friction material and, when mixed in the manner and proportions suggested, provide a class of friction materials with higher performances with respect to those of cementitious materials according to the state of the art.

For a complete homogenization, the cement, water, and other components forming the friction material are mixed, in appropriate proportions, until a homogeneous, lump-free paste is obtained, having a suitable consistency, which is then subjected to a moulding process for the production of brake pads.

The braking mixture thus obtained is subsequently subjected to a compression moulding process at a temperature ranging from 40 to 90° C., preferably from 40 to 80° C., and a pressure ranging from 1 to 6 kN/cm$^2$, preferably from 2 to 5 kN/cm$^2$, said temperature and pressure conditions having proved to be optimum for the moulding of brake pads starting from the friction materials according to the present invention.

After the moulding process, the brake pads thus obtained, starting from 24 hours after the moulding process, preferably after 7 days, even more preferably after 14 days, are subjected to a thermal treatment at a temperature ranging from 25° C. to 800° C., preferably from 25° C. to 600° C., more preferably from 25° C. to 450° C.

As already explained above, it is known from the state of the art that cementitious-based materials such as cement mortars/pastes, when subjected to thermal treatment higher than 300° C., undergo a progressive loss in final physicomechanical properties of the end-product. Regardless of the type of curing, in fact, the decrease in performance of the elastic module of a mortar test-sample thermally treated at 300° C., with respect to an identical test-sample not thermally treated, oscillates around 30% with respect to the initial value.

The cementitious binders present in the friction material according to the present invention, for the production of brake pads, after the moulding process and possible thermal treatment, surprisingly show improved performances such as stability of the braking efficiency.

After about 28 days of curing subsequent to moulding, the pads are characterized and tested as indicated hereunder.

The characterization of the pads produced with the moulding process with the preselected formulations is based on an evaluation of the following aspects:
A) uniformity and regularity of the profile of the edges and absence of defects in shape;
B) compressibility and surface hardness;
C) tribological characteristics of the friction material, determined through tests called AK Master and "high-temperature internal test".

The characterizations A) and B) are effected by means of the following tests:
A) uniformity and regularity of the profile of the edges and absence of defects in shape: this is basically an evaluation of the moulding test that consists in observing the following parameters: A1) homogenous filling of the mould with the material with the consequent production of a product free from defects; A2) observation of possible surface oxidations or abnormal bulges. These observations are effected by means of a visual verification and by means of a flatness and parallelism measurement of the end-product.
B) "compressibility" according to ISO-6310 and "surface hardness" according to JIS D4421; the compressibility and surface hardness respectively provide an indication of the dimensional variation under compression regime and a homogeneity index of the mechanical properties between peripheral areas and the central part of the surface of the pad.

For a friction material, acceptable compressibility values according to the standard ISO-6310, are values within the range of 20 to 120 microns, whereas acceptable surface hardness values (HRR) according to the standard JIS D4421, are values within the range of 10 to 120.
C) Tribological characteristics The tribological characteristics of the friction material are determined through tests called SAE J2522 (called "AK Master") and "high-temperature internal test".

The AK Master test is a performance test, in which a pair of pads are tested under various braking conditions: after a trial stage, a series of brakings are simulated at different pressures and speeds (low, intermediate and high), and characteristic brakings, such as cold braking and motorway braking.

The "high-temperature internal test" is carried out on a dynamic bench, where the experimental setup is assembled, including calipers, disc and brake pad, which replicates the system fitted on the axle shaft of the selected vehicle, to which a flywheel that simulates an inertial load equivalent to the mass of the fully loaded vehicle, is connected. A first running phase provides 60 brake applications from 80 Km/h to 30 Km/h with a controlled deceleration of 3 m/s$^2$ and an initial disc temperature of 100° C. The test then consists of a series of brakings all with a defined initial speed, equal to 80% of the maximum speed of the vehicle and a final speed equal to 90 Km/h, with a deceleration greater than or equal to 7 m/s$^2$. A total of 25 brake applications are effected, interspersed by a cooling time of 80 seconds, followed by 5 brakings under the same speed and deceleration conditions as those indicated above, effected however after cooling the system to the initial disc temperature specified above.

The main advantage of the friction material according to the present invention is that it allows brake pads to be produced, having a much higher eco-sustainability, as there is no release, in fact, of phenolic or phenol-formaldehyde derivatives into the atmosphere, either during use or during production. Furthermore, thanks to the particular characteristics of the binding compositions according to the present invention, they guarantee analogous performances to those of a material containing phenolic resins and higher performances than those of a material containing a cementitious binding material such as that described in WO'142 and US'774.

Further features and advantages of the invention will appear evident from the following examples provided for illustrative and non-limiting purposes.

EXAMPLE 1

A friction material was prepared, having the composition indicated in Table 1 below.

TABLE 1

| | |
|---|---|
| Hydraulic binder based on TERMOCEM A 32.5 N LH Calusco with a fineness of 6500 cm$^2$/g (blaine) | 11.56% |
| Potassium silicate | 0.74% |
| Multicomponent braking blend | 82.31% |
| Hydrophobic agent | 0.28% |
| Water | 5.10% |

More specifically, the friction material was prepared rising a binding composition containing a TERMOCEM A 32.5 N LH Calusco cement, over-ground until a fineness equal to 6,500 cm$^2$/g, approximately, was obtained.

TERMOCEM A 32.5 N LH cement is a blast-furnace cement of type III. In accordance with the composition required by the standard UNI EN 197-1 (i.e. referring to the mass of cement excluding calcium sulfate and additives), it contains 35%-64% of clinker, whereas the remaining part consists of granulated blast-furnace slag and possible secondary constituents.

Said binding composition comprises the hydraulic binder TERMOCEM A 32.5 N LH Calusco in a quantity equal to 11.56% by total weight with respect to the total weight of the mixture forming the friction material and also contains potassium silicate in a quantity equal to 0.74% by weight and the waterproofing additive Seal 200 (a mixture of polyvinylalcohol and silane, i.e. an alkylsiloxane) in a quantity equal to 0.28% by weight, both with respect to the total weight of the mixture of the friction material.

The multicomponent braking blend used in the present example is composed of:

| | |
|---|---|
| Aluminium oxides | 6.0 |
| Steel fibers | 29.8 |
| Chromite | 4.8 |
| Tin and molybdenum sulfides | 8.4 |
| Graphite | 7.2 |
| Coke | 12.9 |
| Metal powders | 19.0 |
| Barite | 9.5 |
| Rubber | 2.4 |

The percentage quantities of the components of the multicomponent braking blend indicated in the previous table are fractions by weight with respect to the total weight of the multicomponent braking blend alone.

The friction material thus obtained was compression moulded using appropriate moulds, under temperature and pressure conditions of 50° C. and 4.5 kN/cm$^2$, leading to the production of a pad having a surface of 77 cm$^2$, and a thickness equal to 1.5 cm.

More specifically, the moulds used in the tests indicated in the present example are moulds that provide for the production of a pad with a surface of 77 cm$^2$, and a thickness equal to 1.5 cm. After a week of curing in air, the pads were ground.

After approximately 21 days of curing subsequent to moulding, the pads were subjected to a cycle of thermal treatment in a nitrogen atmosphere according to the thermal cycle indicated hereunder:

Heating profile from 25 to 450° C. in 3 hours;
Isotherm at 450° C. for 1 hour;
Cooling from 450 to 25° C. by natural cooling in a closed oven in a nitrogen atmosphere.

The pads were then varnished according to the normal method.

Approximately 28 days after moulding (curing time), the pads were characterized and tested as indicated hereunder.

The pads obtained from the formulation indicated in table 1 were visually observed and do not show either surface oxidations or abnormal bulges.

HRR surface hardness tests of the end-product thus obtained were then carried out according to the standard JIS D4421, obtaining an average value of 44, also indicating a good homogeneity of the mechanical properties between peripheral and central surface areas of the pad.

This aspect of homogeneity is extremely important for producing a friction material that does not have potential detachment points and is consequently characterized by a high wear resistance. Uniformity and regularity of the profile of the edges and homogeneity of the central part of the pad with respect to the peripheral areas are essential elements for having an analogous or improved wear of the pad with respect to the values typical of pads that use phenolic resins as binders.

The "Compressibility" tests according to ISO-6310 showed an average value equal to 72 microns. The pads, tested according to the AK Master test, showed surprising wear values ranging from 0.45 to 0.49 mm (this value refers to the average of the measurements effected on the pair of pads), an average friction coefficient equal to 0.41, whereas the appearance of the pads and discs proved to be visually acceptable according to the standards generally obtained with traditional pads with a binder based on thermosetting resin.

Figure 1:
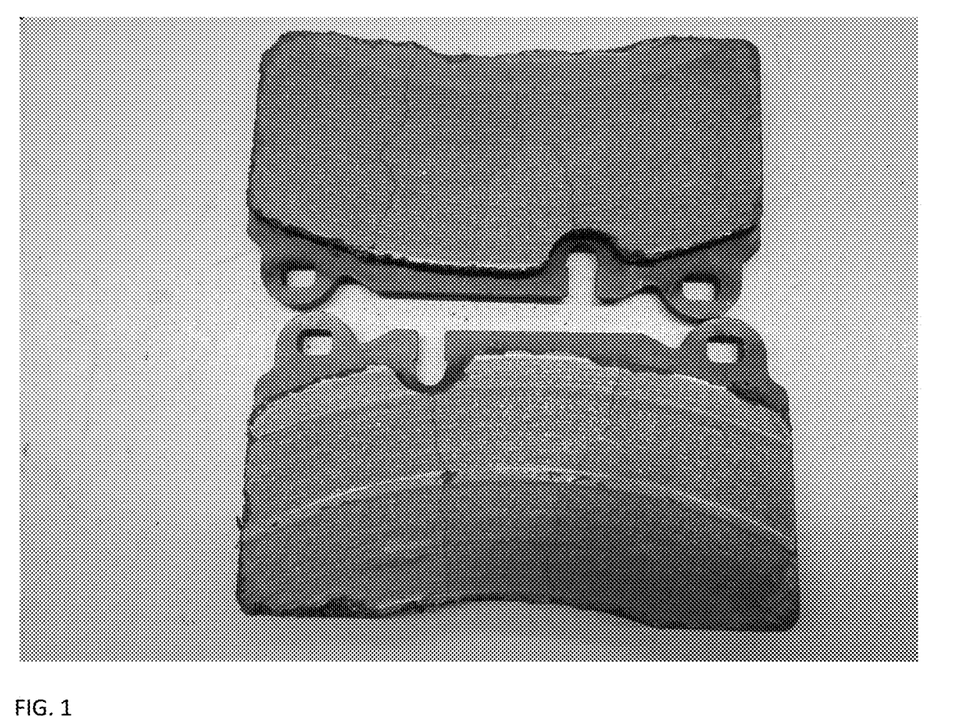
FIG. 1 depicts pads tested according to the "high-temperature internal test" set forth in Example 1.

The pads tested according to the "high-temperature internal test" previously described, are shown in FIG. 1. It is evident on a visual level that the pads tested do not have any detachment of material from delaminating and/or extensive and significant cracks at the end of the test.

EXAMPLE 2

A friction material was prepared, with the composition indicated in table 2 below.

TABLE 2

| | |
|---|---|
| Hydraulic binder based on Cement type I 52.5 R (6500 cm$^2$/g) and metakaolin | 7.33% |
| Potassium hydroxide | 4.73% |
| Multicomponent braking blend | 75.90% |
| Water | 12.04% |

More specifically, the friction material was prepared using a binding composition containing a cement type I 52.5R produced in the Calusco cement plant, over-ground until a fineness of about 6,500 cm$^2$/g was obtained, added to metakaolin, in a quantity equal to 7.33% by weight with respect to the total weight of the composition forming the friction material. The ratio between cement and metakaolin was 1:9 parts by weight respectively.

| | |
|---|---|
| Aluminium oxides | 6.1 |
| Steel fibers | 30.5 |
| Chromite | 4.8 |
| Tin and molybdenum sulfides | 8.5 |
| Graphite | 7.3 |
| Coke | 13.4 |
| Metal powders | 19.5 |
| Barite | 9.9 |

The percentage quantities of the components of the multicomponent braking blend indicated in the previous table should be considered as being quantities by weight with respect to the total weight of the multicomponent braking blend alone.

The friction material thus obtained was compression moulded using appropriate moulds, under temperature and pressure conditions of 50° C. and 4.5 kN/cm$^2$, leading to the production of a pad having a surface of 77 cm$^2$, and a thickness equal to 1.5 cm.

After a week of curing in air, the pads were ground.

Approximately 28 days after moulding (curing time), the pads were then varnished according to the usual method, characterized and tested as indicated hereunder.

The pads obtained from the formulation indicated in table 2 were visually observed and do not show either surface oxidations or abnormal bulges.

HRR surface hardness tests of the end-product thus obtained were then carried out according to the standard JIS D4421, obtaining an average value of 76 and also indicating a good homogeneity of the mechanical properties between peripheral and central surface areas of the pad.

This aspect of homogeneity is extremely important for producing a friction material that does not have potential detachment points and is consequently characterized by a high wear resistance. Uniformity and regularity of the profile of the edges and homogeneity of the central part of the pad with respect to the peripheral areas are essential elements for having an analogous or improved wear of the pad with respect to the values typical of pads that use phenolic resins as binders.

The "Compressibility" tests according to ISO-6310 showed an average value equal to 36 microns. The pads, tested according to the AK Master test, showed surprising wear values ranging from 0.28 to 0.32 mm (this value refers to the average of the measurements effected on the pair of pads), an average friction coefficient equal to 0.39, whereas the appearance of the pads and discs proved to be visually acceptable according to the standards generally obtained with traditional pads with a binder based on thermosetting resin.

The pads tested according to the "high-temperature internal test" previously described, on a visual level do not have any detachment of material from delaminating and/or extensive and significant cracks at the end of the test.

EXAMPLE 3 (COMPARATIVE)

A friction material was prepared, with the composition indicated in table 3 below.

TABLE 3

| | |
|---|---|
| Hydraulic binder based on Cement type I 52.5 R (6,500 cm$^2$/g) and metakaolin | 11.79% |
| Multicomponent braking blend | 78.05% |
| Water | 10.16% |

More specifically, the friction material was prepared using a binding composition containing a cement type I 52.5R produced in the Calusco cement plant, over-ground until a fineness of about 6,500 cm$^2$/g was obtained. Said binding composition was added, in a quantity equal to 11.79% by weight with respect to the total weight of the composition forming the friction material.

The multicomponent braking blend used in the present example was composed of:

| | |
|---|---|
| Aluminium oxides | 5.4 |
| Steel fibers | 27.2 |
| Chromite | 4.3 |
| Tin and molybdenum sulfides | 7.6 |
| Graphite | 6.5 |
| Coke | 12.0 |
| Metal powders | 17.4 |
| Barite | 8.7 |

-continued

| | |
|---|---|
| Magnesium oxide | 6.5 |
| Aramidic fiber | 2.2 |
| Rubber | 2.2 |

The percentage quantities of the components of the multicomponent braking blend are expressed as quantities by weight with respect to the total weight of the multicomponent braking blend alone. The friction material thus obtained was compression moulded using appropriate moulds, under temperature and pressure conditions of 50° C. and 4.5 kN/cm$^2$, leading to the production of a pad having a surface of 77 cm$^2$, and a thickness equal to 1.5 cm.

After a week of curing in air, the pads were ground.

Approximately 28 days after moulding (curing time), the pads were then varnished according to the usual method, characterized and tested as indicated hereunder. The pads obtained from the formulation indicated in table 3 were visually evaluated and do not show either surface oxidations or abnormal bulges.

HRR surface hardness tests of the end-product thus obtained were then carried out according to the standard JIS D4421, obtaining an average value of 70 and also indicating a good homogeneity of the mechanical properties between peripheral and central surface areas of the pad.

This aspect of homogeneity is extremely important for producing a friction material that does not have potential detachment points and is consequently characterized by a high wear resistance. Uniformity and regularity of the profile of the edges and homogeneity of the central part of the pad with respect to the peripheral areas are essential elements for having an analogous or improved wear of the pad with respect to the values typical of pads that use phenolic resins as binders.

The "Compressibility" tests according to ISO-6310 showed an average value equal to 63 microns. The pads, tested according to the AK Master test, showed surprising wear values of about 0.33 (this value refers to the average of the measurements effected on the pair of pads), an average friction coefficient equal to 0.42, whereas the appearance of the pads and discs proved to be visually acceptable according to the standards generally obtained with traditional pads with a binder based on thermosetting resin.

Figure 2:
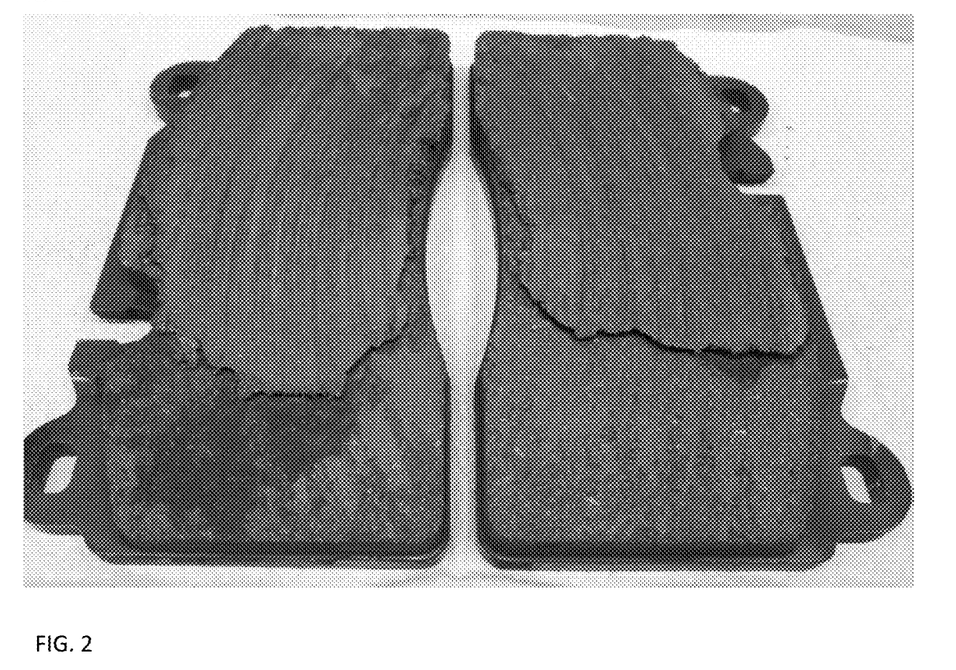
FIG. 2 depicts pads tested according to the "high-temperature internal test" set forth in Example 3.

The pads tested according to the "high-temperature internal test" previously described, on a visual level, have significant surface delaminations at the end of the test with detachment of the material and/or deep cracks, as shown in FIG. 2.

It is therefore evident that under more severe conditions such as those characteristic of the "high-temperature internal test", the brake pad produced with the friction material according to the present invention (table 1 or table 2) has a better overall general behaviour with respect to the brake pad obtained starting from the friction material described in table 3.

EXAMPLE 4 (COMPARATIVE)

A friction material was prepared, with the composition indicated in table 4 below, by mixing in a planetary mixer.

TABLE 4

| | |
|---|---|
| Potassium silicate | 3.85% |
| Potassium hydroxide | 4.92% |
| Metakaolin | 9.62% |

TABLE 4-continued

| | |
|---|---|
| Alumina | 11.15% |
| Graphite | 23.08% |
| Iron powder | 15.38% |
| Resin | 3.85% |
| Water | 28.15% |

More specifically, the friction material was prepared using the composition described in Table 4, by mixing in a planetary mixer, until a homogeneous blend was obtained; the blend was then poured into a mould for the production of brake pads and then subjected to thermal treatment at 80° C. for 90 minutes and subsequently at 120° C. for 2 hours.

More specifically, the moulds used in the tests indicated in the present example are moulds for the production of a pad with a surface of 77 cm², and a thickness equal to 1.5 cm.

Approximately 28 days after moulding (curing time), the pads were then characterized and tested as indicated hereunder.

Figure 3:
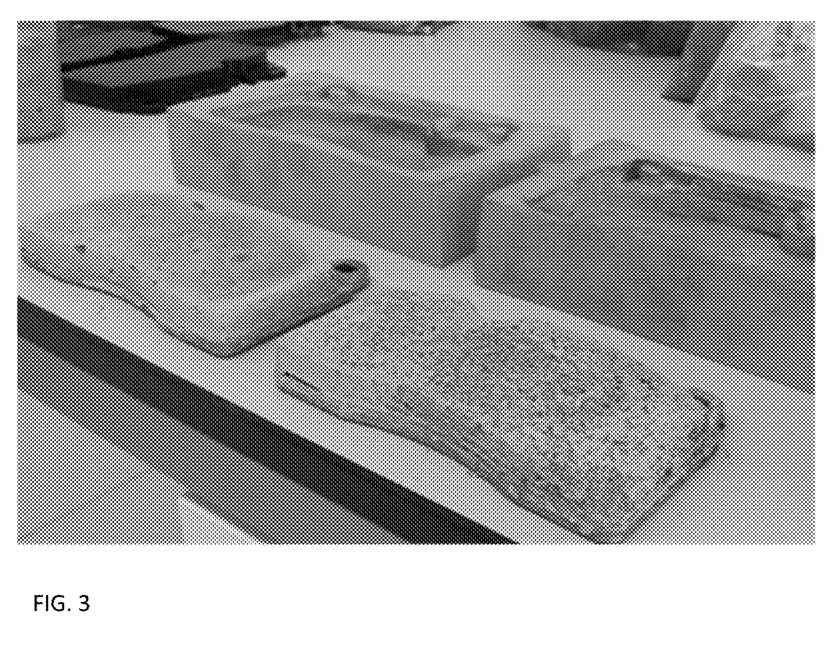
FIGS. 3-5 depict pads obtained from the formulation set forth in Table 4.
Figure 4:
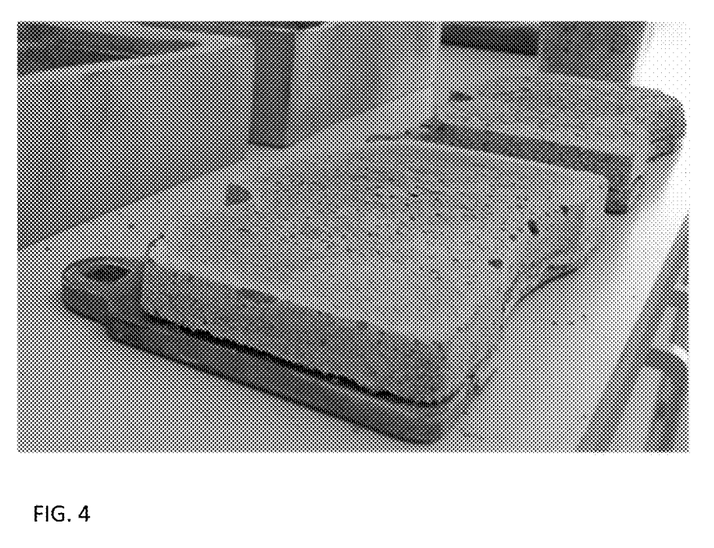
Figure 5:
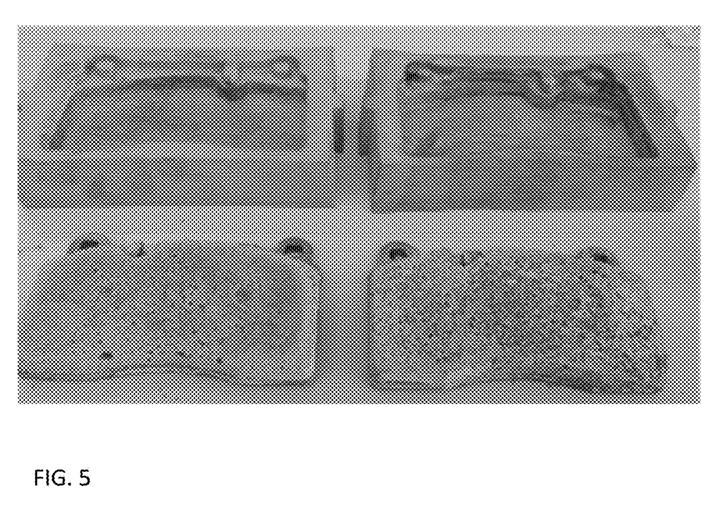

The pads obtained from the formulation indicated in table 4 were visually observed: they show visibly irregular and relatively non-compact surfaces, the surface proves to be fragile and easily friable to touch, as shown in FIGS. 3-5.

For these pads, it was therefore not possible to carry out the tests effected for the friction material according to the present invention.

The invention claimed is:

1. A friction material for brake pads which comprises:
   i) a multicomponent braking blend comprising a metal and
   ii) a composition or binder matrix based on a hydraulic binder, comprising
      a) a hydraulic binder consisting of a cement clinker, composed of at least two thirds in mass of calcium silicates [3CaO.SiO₂] and [2CaO.SiO₂], and a remaining part consisting of Al₂O₃, Fe₂O₃ and/or other minor oxides;
      b) an activator selected from the group consisting of silicon oxide, potassium oxide, sodium oxide, potassium hydroxide, sodium hydroxide, potassium silicate, and combinations thereof;
      c) one or more materials having a pozzolanic activity, one or more materials having a latent hydraulic activity, and/or mixtures of the same;
said composition or binder matrix adapted to be hardened by a hydration reaction with water; wherein the hydraulic binder a) is a Portland cement clinker of type I, a blast-furnace cement of type III, a pozzolana cement of type IV and mixtures thereof.

2. The friction material according to claim 1, wherein the binder composition ii) based on a hydraulic binder is present in a quantity ranging from 3 to 60% by weight with respect to the total weight of a mixture forming the friction material.

3. The friction material according to claim 1, wherein the hydraulic binder a) is present in a quantity ranging from 0.5 to 95% by weight, with respect to the total weight of the binder composition ii), the activator b) is present in a quantity ranging from 0.5 to 50% by weight with respect to the total weight of the binder composition ii), the materials with a pozzolanic activity and/or latent hydraulic activity c) are present in a quantity ranging from 0.5 to 95% by weight, with respect to the total weight of the binder composition ii), optional aggregates are present in a quantity ranging from 0 to 20% by weight with respect to the total weight of the binder composition ii), and optional additives in a quantity ranging from 0 to 5% by weight with respect to the total weight of the binder composition ii).

4. The friction material according to claim 1, further comprising water in a quantity ranging from 25 to 150% by weight with respect to the total weight of the binder composition based on the hydraulic binder ii).

5. The friction material according to claim 1, wherein the multicomponent braking blend i) is present in a quantity ranging from 30 to 97% by weight with respect to the total weight of a mixture forming the friction material.

6. The friction material according to claim 1, wherein the multicomponent braking blend i) comprises at least one lubricant in a quantity ranging from 5 to 15% by weight, at least one abrasive in a quantity ranging from 8 to 25% by weight, at least one component containing carbon in a quantity ranging from 8 to 25% by weight, at least one modifier in a quantity ranging from 15 to 30% by weight, all the quantities being calculated with respect to the total weight of the multicomponent braking blend i).

7. The friction material according to claim 1, wherein the friction material consists of ii) a binder composition based on a) Portland cement of type I 52.5, with a fineness of 6,500 cm²/g, b) potassium silicate and potassium hydroxide, c) slag with a fineness of 6,500 cm²/g and metakaolin, and water, and the multicomponent braking blend i) comprises one or more components selected from the group consisting of aluminium oxides, steel fibres, chromite, tin and molybdenum sulfides, graphite, coke, metal powders, barite, and combinations thereof.

8. The friction material according to claim 1, wherein component b) of the binder composition ii) is selected from the group consisting of silicon oxide, potassium oxide, potassium hydroxide, silicates, and combinations thereof.

9. The friction material according to claim 1, wherein the one or more materials having a pozzolanic activity comprises one or more of microsilica, fly ash, pozzolan, silica fume, and metakaolin.

10. The friction material according to claim 1, wherein the one or more materials having a latent hydraulic activity comprises one or more of blast furnace slag, hydrated calcium, and natural limestone.

11. The friction material according to claim 2, wherein the binder composition ii) based on a hydraulic binder is present in a quantity ranging from 5 to 52% by weight with respect to the total weight of the mixture forming the friction material.

12. The friction material according to claim 3, wherein the hydraulic binder a) is present in a quantity ranging from 10 to 93% by weight.

13. The friction material according to claim 3, wherein the materials with a pozzolanic activity and/or latent hydraulic activity c) are present in a quantity ranging from 10 to 93% by weight with respect to the total weight of the binder composition.

14. The friction material according to claim 4, comprising water in a quantity ranging from 50 to 150% by weight with respect to the total weight of the binder composition based on the hydraulic binder ii).

15. The friction material according to claim 5, wherein the multicomponent braking blend i) is present in a quantity ranging from 50 to 95% by weight with respect to the total weight of the mixture forming the friction material.

16. Brake pads consisting of a friction material according to claim 1 and a metallic support base.

17. A method of braking comprising forcing a friction material comprising a binder composition comprising a hydraulic binder and a multicomponent braking blend according to claim 1, against a moving component for braking pads.

* * * * *